April 15, 1924.
O. G. WHEATON
DIVIDER FOR MOWING MACHINES
Filed July 23, 1923
1,490,151
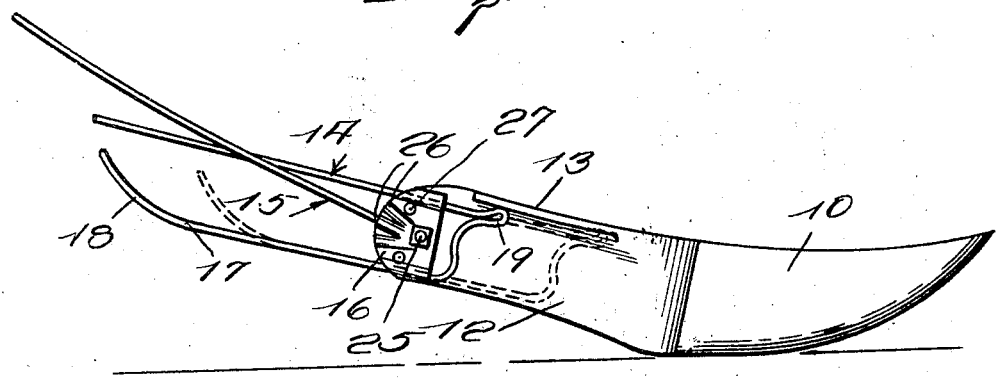
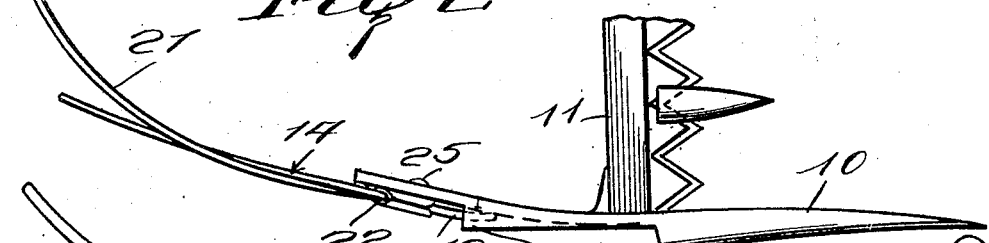
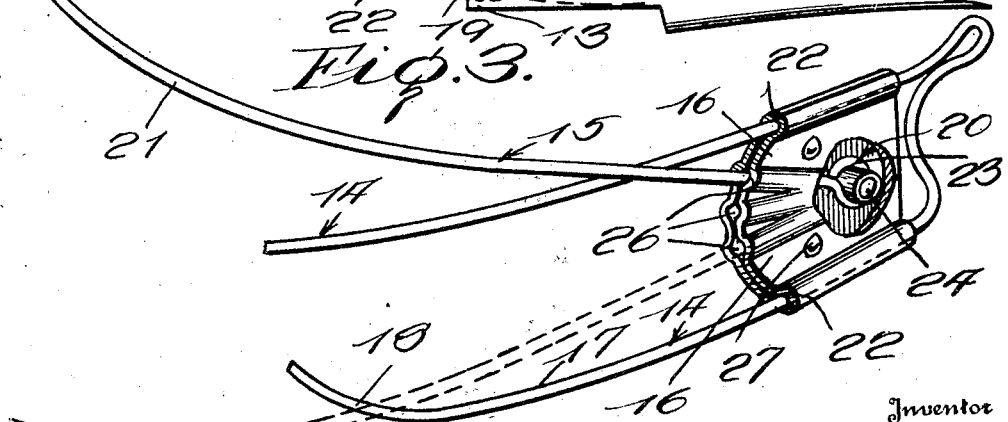
Inventor
Orion G. Wheaton
By Watson E. Coleman
Attorney Patented Apr. 15, 1924.

1,490,151

UNITED STATES PATENT OFFICE.

ORION G. WHEATON, OF MILLIKEN, COLORADO.

DIVIDER FOR MOWING MACHINES.

Application filed July 23, 1923. Serial No. 653,256.

*To all whom it may concern:*

Be it known that I, ORION G. WHEATON, a citizen of the United States, residing at Milliken, in the county of Weld and State of Colorado, have invented certain new and useful Improvements in Dividers for Mowing Machines, of which the following is a specification, reference being had to the accompanying drawings.

This invention relates to dividers for mowing machines.

An important object of the invention is to provide a device of this character particularly adapted for use in connection with mowing machines when mowing tangled hay or grain and contemplates the replacement of the usual divider board provided on such mowing machines.

A further object of the invention is to provide a device of this character which is adjustable and which is readily applied to and removed from the mowing machine.

A further object of the invention is to provide a device of this character, the adjustment of which may be accomplished without removing the device from the machine.

These and other objects I attain by the construction shown in the accompanying drawings, wherein for the purpose of illustration is shown a preferred embodiment of my invention and wherein:—

Figure 1 is a side elevation of a shoe showing a divider applied thereto in accordance with my invention, the divider being shown in one adjusted position in dotted lines;

Figure 2 is a plan view thereof; and

Figure 3 is a perspective of the divider, a portion of one of the plates being broken away to show the mounting of the adjustable arm.

Referring now more particularly to the drawings, the numeral 10 indicates the outside shoe of a mowing machine and 11 the cutter bar thereof. The outside shoe of these mowing machines is usually provided at its rear end with a transversely inclining portion 12 extending behind the cutter bar and provided upon its outer face adjacent its top with a flange 13. This inclined portion is adapted for the attachment of the divider board of the shoe, (not herein disclosed), the flange 13 limiting the downward movement of the rear end of the board.

In accordance with my invention I remove the divider board and replace the same by a divider composed of a main frame 14, an adjustable arm 15, and mounting plates 16 for mounting the main frame 14 and adjustable arm 15 upon the inclined end 12 of the shoe. The main frame 14 comprises a piece of spring steel bent in U-shape, the lower arm 17 thereof having its rear end portion bent upwardly, as at 18, toward the rear end of the upper arm. The bight portion of the main frame is constructed to form an extension 19 which is bent at an angle to the main body of the U for a purpose presently to appear. Those portions of the arms of the U adjacent such bight portion are substantially parallel. The adjustable arm 15 comprises a length of spring steel formed at its forward end with an eye 20 and having its rear end 21 curved transversely so that it will extend behind the cutter bar.

The plates 16 are formed to provide parallel upper and lower edges each formed with a groove 22, these grooves opposing when the plates are in assembled relation to provide guideways for the arms of the main frame 14. Each plate has formed therein an opening 23 through which is directed a gudgeon 24 to receive a securing bolt 25 by means of which the plates are mounted upon the transversely angular extension 12 of the shoe. When the main frame is in position upon the plates and the plates are secured in this position the angular extension 19 thereof extends beneath the flange 13 so as to limit the downward movement of the outer end of the main frame, it being obvious that since the bolt extends through the gudgeon and the gudgeon is of greater length than the thickness of the plates, the plates will be in effect rotatably mounted upon the gudgeon and would otherwise drop downwardly to engage the ground. About this gudgeon between the plates the eye 20 of the adjustable arm 15 is engaged. Each plate is provided with a plurality of grooves 26 radiating rearwardly from the opening 23 for the reception of the arm 15. Through the plates are directed securing elements 27 by means of which the plates may be clamped upon the arm. It will be obvious that by loosening these securing elements the elevation of the rear end of the adjustable arm may be controlled. Furthermore, the extent of rearward extension of the arms of the main frame may be controlled. The arms being slid through the openings formed by the combination of the grooves 22, the arm 15 may be removed, in which event the main frame operates in substantially the same manner as the ordinary board. With the arm 15 in position the transverse curvature thereof causes the cut hay to be thrown further from the point of cut thereby more perfectly delineating the cut where the hay is tangled or beaten down. The adjustment of the arm 15 vertically provides for its use with hay of various heights and this adjustment may be accomplished without the necessity of removing the divider from the shoe. Many changes being possible in the construction of the device as hereinbefore set forth without in any manner departing from the spirit of my invention I accordingly do not limit myself to such specific structure except as hereinafter claimed.

I claim:

1. In a divider for mowing machines having an outer shoe provided with a transversely and rearwardly inclining divider board extension having upon its outer face adjacent the top thereof an outstanding flange, a pair of plates pivotally mounted upon said extension, a reclining U-shaped frame adjustable through said extension and having its bight portion provided with a portion for engaging beneath the flange of the extension, an arm pivoted between the plates and having its rear end vertically adjustable, said arm being transversely curved, and means for clamping said plates upon said main frame and arm.

2. In a divider for mowing machines having an outer shoe provided with a transversely and rearwardly inclining divider board extension having upon its outer face adjacent the top thereof an outstanding flange, a pair of plates pivotally mounted upon said extension, a reclining U-shaped frame adjustable through said extension and having its bight portion provided with a portion for engaging beneath the flange of the extension, an arm pivoted between the plates and having its rear end vertically adjustable, said arm being transversely curved, and means for clamping said plates upon said main frame and arm, said plates having a plurality of grooves radial to the pivot of the arm in which the arm is selectively engageable.

3. In a divider for mowing machines having an outer shoe provided with a transversely and rearwardly inclining divider board extension having upon its outer face adjacent the top thereof an outstanding flange, a pair of plates pivotally mounted upon said extension, a reclining U-shaped frame adjustable through said extension and having its bight portion provided with a portion for engaging beneath the flange of the extension, an arm pivoted between the plates and having its rear end vertically adjustable, said arm being transversely curved, and means for clamping said plates upon said main frame and arm, said plates having grooves receiving the arms of said frame and through which said frame is adjusted.

4. In a divider for mowing machines having an outer shoe provided with a transversely and rearwardly inclining divider board extension having upon its outer face adjacent the top thereof an outstanding flange, a pair of plates pivotally mounted upon said extension, a reclining U-shaped frame adjustable through said extension and having its bight portion provided with a portion for engaging beneath the flange of the extension, an arm pivoted between the plates and having its rear end vertically adjustable, said arm being transversely curved, means for clamping said plates upon said main frame and arm, said plates having a plurality of grooves radial to the pivot of the arm in which the arm is selectively engageable, and other grooves through which the arms of said frame are directed whereby said frame is adjustable longitudinally of the extension upon release of said securing elements.

In testimony whereof I hereunto affix my signature.

ORION G. WHEATON.